United States Patent
Sugitani

(10) Patent No.: US 11,573,479 B2
(45) Date of Patent: Feb. 7, 2023

(54) LENS CONTROL APPARATUS AND METHOD FOR CONTROLLING THE SAME

(71) Applicant: CANON KABUSHIKI KAISHA, Tokyo (JP)

(72) Inventor: Kuniaki Sugitani, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 348 days.

(21) Appl. No.: 16/696,179

(22) Filed: Nov. 26, 2019

(65) Prior Publication Data

US 2020/0183252 A1 Jun. 11, 2020

(30) Foreign Application Priority Data

Dec. 6, 2018 (JP) .............................. JP2018-228923

(51) Int. Cl.
  *G03B 13/36* (2021.01)
  *G03B 3/10* (2021.01)
  *H04N 5/232* (2006.01)

(52) U.S. Cl.
  CPC ............... *G03B 13/36* (2013.01); *G03B 3/10* (2013.01); *H04N 5/23222* (2013.01)

(58) Field of Classification Search
  CPC .......... G03B 13/34; G03B 13/36; G03B 3/10; H04N 5/23222; H04N 5/23212
  See application file for complete search history.

(56) References Cited

U.S. PATENT DOCUMENTS

| 2004/0004670 | A1 | 1/2004 | Yamashita |
| 2019/0149741 | A1* | 5/2019 | Sugitani ............. H04N 5/23212 348/349 |
| 2019/0195631 | A1* | 6/2019 | Xiong ................... H04W 4/029 |

FOREIGN PATENT DOCUMENTS

| DE | 102012211222 A1 * | 1/2013 | ............. G01S 17/10 |
| JP | 8-43055 A | 2/1996 | |
| JP | 2001-21794 A | 1/2001 | |
| JP | 2016-157067 A | 9/2016 | |

* cited by examiner

*Primary Examiner* — Clayton E. LaBalle
*Assistant Examiner* — Fang-Chi Chang
(74) *Attorney, Agent, or Firm* — Canon U.S.A., Inc. IP Division

(57) ABSTRACT

A microcomputer estimates information corresponding to an image plane position of an object based on a sequential identification method using a focus detection result. Moreover, the microcomputer predicts information corresponding to a future image plane position of the object based on the estimated information corresponding to the image plane position of the object. The microcomputer controls driving of a focus lens based on the predicted information corresponding to the future image plane position of the object. In accordance with information corresponding to a motion of the object, the microcomputer selects by which of a first Kalman filter and a second Kalman filter the information corresponding to the future image plane position of the object is predicted by using the estimated information corresponding to the image plane position of the object.

18 Claims, 10 Drawing Sheets

LENS CONTROL APPARATUS AND METHOD FOR CONTROLLING THE SAME

BACKGROUND OF THE INVENTION

Field of the Invention

The aspect of the embodiments relates to prediction of an image plane position.

Description of the Related Art

A technique of the related art in which, in order to focus on a moving object, on the basis of a focus detection result at a certain time, an image plane position at a time later than the time is predicted, and driving of a focus lens is controlled on the basis of the predicted image plane position has been proposed.

Japanese Patent Laid-Open No. 2001-21794 describes that a technique in which a plurality of pieces of data related to an image plane position and a time of corresponding focus detection are used to obtain a coefficient best fit to a prediction function by a least squares method (also referred to as a batch least squares method) so that the image plane position is predicted is known.

SUMMARY OF THE INVENTION

An apparatus according to an aspect of the embodiments includes: a focus detection unit configured to acquire a focus detection result; an estimation unit configured to estimate information corresponding to an image plane position of an object based on a sequential identification method using the focus detection result; a prediction unit configured to predict information corresponding to a future image plane position of the object based on the estimated information corresponding to the image plane position of the object; and a control unit configured to control driving of a focus lens based on the predicted information corresponding to the future image plane position of the object, in which the estimation unit includes a first estimation unit configured to estimate first information as the information corresponding to the image plane position of the object and a second estimation unit configured to estimate second information as the information corresponding to the image plane position of the object, and the prediction unit selects any of the first information and the second information in accordance with information corresponding to a motion of the object and uses the resultant for prediction of the information corresponding to the future image plane position of the object.

Further features of the disclosure will become apparent from the following description of exemplary embodiments with reference to the attached drawings.

DESCRIPTION OF THE EMBODIMENTS

Embodiment 1

An embodiment to which the disclosure is applied will be described below. In the present embodiment, an example in which the disclosure is applied to a digital single lens reflex camera will be described as an example.

<Configuration of Imaging Apparatus>

Figure 1:
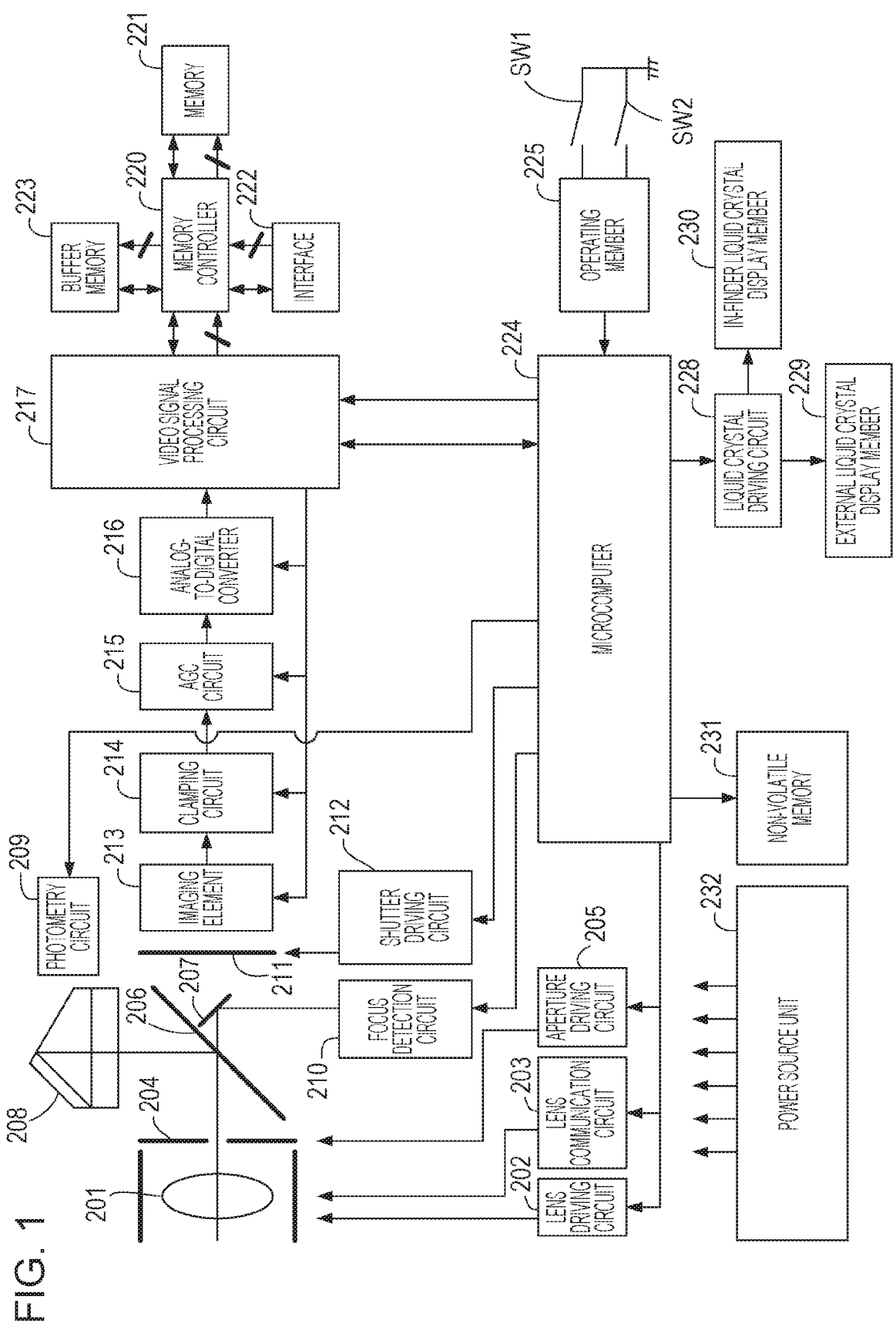
FIG. 1 is a block diagram illustrating a configuration of a digital single lens reflex camera in Embodiment 1.

FIG. 1 is a block diagram illustrating a configuration of the digital single lens reflex camera.

A lens driving circuit 202 has, for example, a DC motor or a stepping motor, and changes a position of a focus lens of an image pickup lens 201 under driving control of a microcomputer 224 and thereby aligns a focal position. That is, lens control is performed by the microcomputer 224.

A lens communication circuit 203 communicates with a microcomputer (not illustrated) inside the image pickup lens 201. A communication content is controlled by the microcomputer 224 and a state of the image pickup lens 201 is acquired.

An aperture driving circuit 205 drives an aperture 204. An amount to be driven is calculated by the microcomputer 224 to change an optical aperture value.

A main mirror 206 is arranged to reflect a light beam so that the light beam is guided to a finder unit (not illustrated), but in a case where image pickup is performed, the main mirror 206 is raised upward so as to guide the light beam to an imaging element 213 and retracts from the light beam. That is, the light beam incident from the image pickup lens 201 is switched between a finder side and an imaging element side. Moreover, the main mirror 206 is a half mirror so that a central portion thereof is able to transmit a part of light, and transmits a part of the light beam so as to be incident on a focus detection sensor that performs focus detection.

A sub-mirror 207 reflects the light beam, which is transmitted through the main mirror 206, and guides the light beam to the focus detection sensor (arranged in a focus detection circuit 210) that performs focus detection.

A pentaprism 208 guides the light beam, which is reflected by the main mirror 206, to the finder unit (not illustrated). Additionally, the finder unit has, for example, a focusing plate and an eyepiece lens (which are not illustrated).

A photometry circuit 209 converts a color and brightness of an image of an object, which is formed in the focusing plate (not illustrated), into an electrical signal by a photometry sensor (arranged in the photometry circuit 209) provided with a color filter.

The light beam transmitted through the central portion of the main mirror 206 and reflected by the sub-mirror 207 reaches the focus detection sensor that is arranged inside the focus detection circuit 210 and performs photoelectric conversion. A defocus amount as a result of the focus detection is obtained by calculating an output of the focus detection sensor. The microcomputer 224 evaluates a calculation result and gives an instruction to the lens driving circuit 202 to drive the focus lens.

A shutter driving circuit 212 drives a focal plane shutter 211. An opening time of the shutter is controlled by the microcomputer 224.

As the imaging element 213, a CCD, a CMOS sensor, or the like is used, and the imaging element 213 converts an image of an object, which is formed by the image pickup lens 201, into an electrical signal.

A clamping circuit 214 and an AGC circuit 215 perform basic analog signal processing performed before analog-to-digital conversion, and a clamping level and an AGC reference level are changed by the microcomputer 224.

An analog-to-digital converter 216 converts an analog output signal of the imaging element 213 into a digital signal.

A video signal processing circuit 217 is achieved by a logic device such as a gate array, and performs filtering processing, color conversion processing, or gamma processing for digitized image data, along with JPEG compression processing or the like, and outputs the resultant to a memory controller 220.

The video signal processing circuit 217 is able to output exposure information of a signal from the imaging element 213 and information such as white balance to the microcomputer 224 as needed. On the basis of these pieces of information, the microcomputer 224 gives an instruction to adjust the white balance or a gain. In a case of a continuous image pickup operation, picked-up data is temporarily stored as an unprocessed image in a buffer memory 223, unprocessed image data is read out through the main controller 220 and is subjected to image processing or compression processing by the video signal processing circuit 217, and continuous image pickup is performed. The number of images picked up continuously depends on a size of the buffer memory 223.

The memory controller 220 stores, in the buffer memory 223, unprocessed digital image data input from the video signal processing circuit 217 and stores processed digital image data in a memory 221. Moreover, the memory controller 220 conversely outputs image data from the buffer memory 223 or the memory 221 to the video signal processing circuit 217. The memory 221 is removable in some cases. The memory controller 220 is able to output an image stored in the memory 221 via an external interface 222 that is able to be connected to a computer or the like.

An operating member 225 conveys a state thereof to the microcomputer 224, and the microcomputer 224 controls each unit in accordance with a change in the operating member 225.

A switch 1 (hereinafter, an SW 1) and a switch 2 (hereinafter, an SW 2) are switches that are turned on or off in accordance with an operation of a release button, and are each one of input switches of the operating member 225. A state where only the SW 1 is on is a state where the release button is pressed halfway, and in this state, an autofocus operation or a photometry operation is performed.

A state where both of the SW 1 and the SW 2 are on is a state where the release button is fully pressed, and is also a state where the release button is on for recording an image. Image pickup is performed in this state. In addition, a continuous image pickup operation is performed while the SW 1 and the SW 2 are continuously on. The operating member 225 is also connected to switches (not illustrated) such as an ISO setting button, an image size setting button, an image quality setting button, and an information display button and a switch state is detected.

A liquid crystal driving circuit 228 drives an external liquid crystal display member 229 or an in-finder liquid crystal display member 230 in accordance with a display content instruction of the microcomputer 224. A backlight (not illustrated) such as an LED is arranged in the in-finder liquid crystal display member 230 and the LED is also driven by the liquid crystal driving circuit 228. The microcomputer 224 is able to calculate the remaining number of images, which are able to be picked up, by checking a memory capacity through the memory controller 220, on the basis of predicted value data of an image size according to ISO sensitivity, an image size, and image quality which are set before image pickup. Display is able to be performed also on the external liquid crystal display member 229 and the in-finder liquid crystal display member 230 as needed.

A non-volatile memory 231 (EEPROM) is able to save data even when a camera is not powered on. For example, a plurality of pieces of information of an image plane position corresponding to defocus amounts detected at different times are stored with information of a corresponding time. Note that, it may be configured so that the information of the time corresponding to the image plane position is stored in a volatile memory (not illustrated) and data is erased when a power source is turned off.

A power source unit 232 supplies power necessary for each IC and a driving system.

Note that, the microcomputer 224 of the present embodiment is an example of an estimation unit and a prediction unit of the claims of the present application.

<Kalman Filter Calculation>

Here, Kalman filter calculation will be described. It is assumed that time-series data y(k) at a time k is provided by the following expression. Note that, the time-series data is also referred to as an observation value. Note that, in the following description, a time k−1, the time k, and a time k+1 all correspond to a time at which the time-series data is obtained.

$$y(k)=X^T(k)A(k)+\omega(k)$$

$$A(k+1)=L(k)A(k)+m(k)v(k)$$

X(k) and m(k) are n-dimensional column vectors, A(k) is an n-dimensional column vector (state vector), ω(k) is observation noise having variance $\sigma_\omega^2$ and an average value of 0, L(k) is an n×n matrix, and v is system noise having variance $\sigma_v^2$ and an average value of 0.

In the Kalman filter calculation, the state vector A(k) is obtained and a calculation step is branched into two of a prediction step and a filtering step. First, a state is estimated in advance at the prediction step, and the state is estimated by using an observation result at the filtering step.

At the prediction step, a prior state estimation vector A'(k) (n-dimensional column vector) and a priori error covariance matrix P'(k) (n×n matrix) are obtained by the following expressions.

$$A'(k)=L(k-1)A(k-1)$$

$$P'(k)=L(k-1)P(k-1)L^T(k-1)+\sigma_v^2(k-1)m(k-1)m^T(k-1)$$

As indicated by the expression described above, the prior state estimation vector A'(k) is used to estimate a state vector at the time k by a state vector (k−1) obtained at the time k−1 and any L(k). Moreover, a priori error covariance matrix P'(k) is an expression to estimate an error between the state vector A(k) at the time k and the prior state estimation vector A'(k).

At the filtering step, the state vector A(k) (n-dimensional column vector) is obtained by the following expression on the basis of the detected time-series data y(k). Moreover, a posterior error covariance matrix P(k) (n×n matrix) is obtained by the following expression.

$$A(k)=A'(k)+g(k)(y(k)-X^T(k)A'(k))$$

$$P(k)=(I-g(k)X^T(k))P'(k)$$

As indicated by the expression described above, A(k) is calculated by adding, to A'(k), a correction value obtained by multiplying a difference between y(k) that is an actual detection result and $X^T(k)A'(k)$ based on a detection result predicted in advance by a Kalman gain g(k). Note that, a matrix I is a unit matrix of n×n.

Further, the Kalman gain g(k) is obtained by the following expression.

$$g(k) = \frac{P'(k)X(k)}{\sigma_\omega^2(k) + X^T(k)P'(k)X(k)} \quad \text{[Mathematical expression 1]}$$

As indicated by the expression described above, as the observation noise $\sigma_\omega^2(k)$ increases, g(k) decreases. Moreover, as the priori error covariance matrix P'(k) increases, g(k) decreases. That is, in a case where it is considered that an error is likely to be caused in y(k) that is detected or $X^T(k)A'(k)$, g(k) is smaller than that of the other case. Thereby, A(k) that is calculated is less likely to be affected by the error.

An initial value A(0) of the state vector and an initial value P(0) of the error covariance matrix are provided by the following expressions.

$$A(0) = \begin{bmatrix} a_0(0) \\ a_1(0) \\ \dots \\ a_{n-1}(0) \end{bmatrix} \quad \text{[Mathematical expression 2]}$$

$$P(0) = p_0 I$$

<Kalman Filter Calculation in Present Embodiment>

The Kalman filter calculation in the present embodiment will be described. A detection result of the image plane position at the time k is indicated by y(k). In the Kalman filter calculation of the present embodiment, as information about a state of an object, the image plane position and an image plane shifting speed at the time k are estimated from the state vector A(k). Further, a state vector A(k+1) is obtained on the basis of the state vector A(k), so that the image plane position and the image plane shifting speed at the time k+1 are estimated as information about the state of the object.

Note that, the image plane position in the present embodiment is a position of a back-side focal point corresponding to the image pickup lens 201 (also referred to as an image plane position of the image pickup lens 201 or a lens image plane position). The image plane position corresponding to the object is a position of the back-side focal point when the image pickup lens 201 is at a position where a front-side focal point thereof is aligned with the object. That is, the image plane position corresponding to the object is a position of the back-side focal point at a time when the focal point on the object is detected, which is calculated on the basis of a result (in the present embodiment, a defocus amount) of the focus detection at the position of the back-side focal point at the time. Though an example in which the image plane position is used as information corresponding to the image plane position will be described in the present embodiment, information other than the image plane position may be used as the information corresponding to the image plane position. For example, since the image plane position corresponds to a position of the image pickup lens 201, the position of the image pickup lens 201 corresponding to the image plane position may be used instead of the image plane position of the present embodiment. In this case, the lens position that corresponds to the image plane position corresponding to the object is a focus lens position calculated as follows. That is, the lens position is the position of the focus lens at a time when the focal point on the object is detected, which is calculated on the basis of a result (in the present embodiment, the defocus amount) of the focus detection at the focus lens position at the time.

Figure 11:
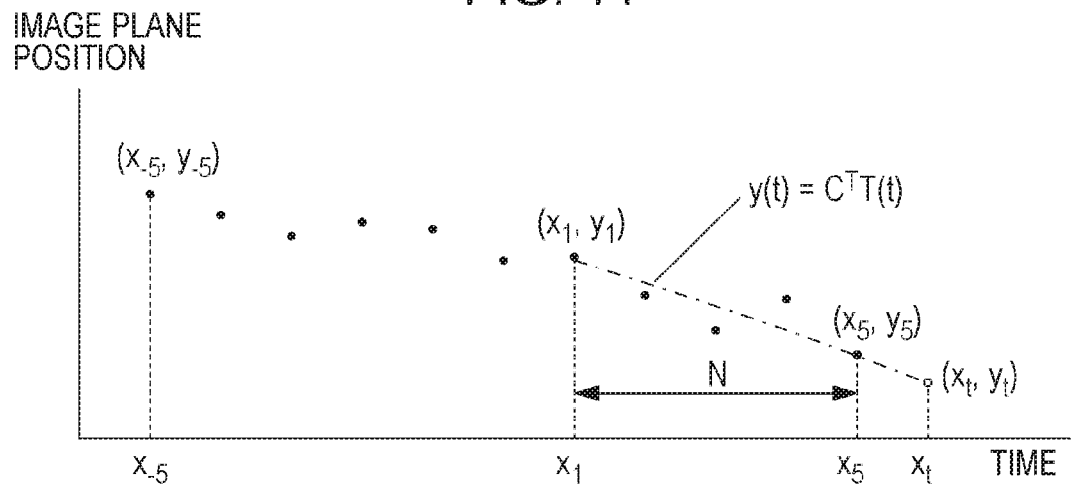
FIG. 11 is a view for explaining a batch least squares method.

Here, a model expression for predicting a motion of the object by using information (the image plane position and the image plane shifting speed that are estimated by the Kalman filter calculation) about the state of the object will be described. FIG. 11 illustrates an example thereof. Considered is prediction of the image plane position of the object, which is performed by a linear expression (two-dimensionally) as indicated by a dotted line in FIG. 11. The model in which the image plane position at the time k is able to be predicted by an average image plane shifting speed v at the time k and an image plane position $y_A$ at a time 0 is assumed. At this time, a column vector A is defined as the image plane position (intercept) $y_A$ at the time 0 and the average image plane shifting speed (slope) v at the time k. Further, a column vector X is defined as 1 so that the time k and $y_A$ are constants. The variance $\sigma_\omega^2$ may be assigned on the basis of variance of a detection result. In the initial value A(0), an initial value of $y_A$ may be assigned, for example, on the basis of an image plane position $y_0$ that is detected for the first time. Moreover, 0 may be assigned to an initial value v of the average image plane shifting speed. An appropriate value may be assigned to the initial value P(0). A matrix L, a column vector m, and the variance $\sigma_v^2$ may be set in accordance with a property of the model, that is, a property of the motion or the like of the object an image of which is to be picked up, or may not vary with time.

Note that, the image plane shifting speed is a speed at which the image plane position shifts and is a speed corresponding to a shifting speed of the object. Though description will be given in the present embodiment by using the image plane shifting speed, the speed is not limited thereto as long as corresponding to the image plane shifting speed. For example, the speed may be a shifting speed of the focus lens position, which corresponds to the shifting speed of the image plane position.

Though an example in which the model expression is the linear expression (two-dimensional) is taken just as an example in the present embodiment, the model expression may be any-dimensional expression in accordance with a motion or the like of the object, which is premised, and the column vector A may be defined in accordance with a dimension of the model expression.

As a result, matrixes, vectors, and variance that are necessary for the prediction step are able to be defined. After that, the filtering step with use of the detection result of the image plane position and a prediction step for a next time are repeated, so that the model expression for predicting the motion of the object by the Kalman filter calculation is able to be obtained.

With the Kalman filter calculation, calculation is performed in consideration of an error as described above, so that the image plane position is able to be predicted accurately even in a situation where an error is easily caused in a focus detection result.

<Calculation by Batch Least Squares Method>

Figure 7:
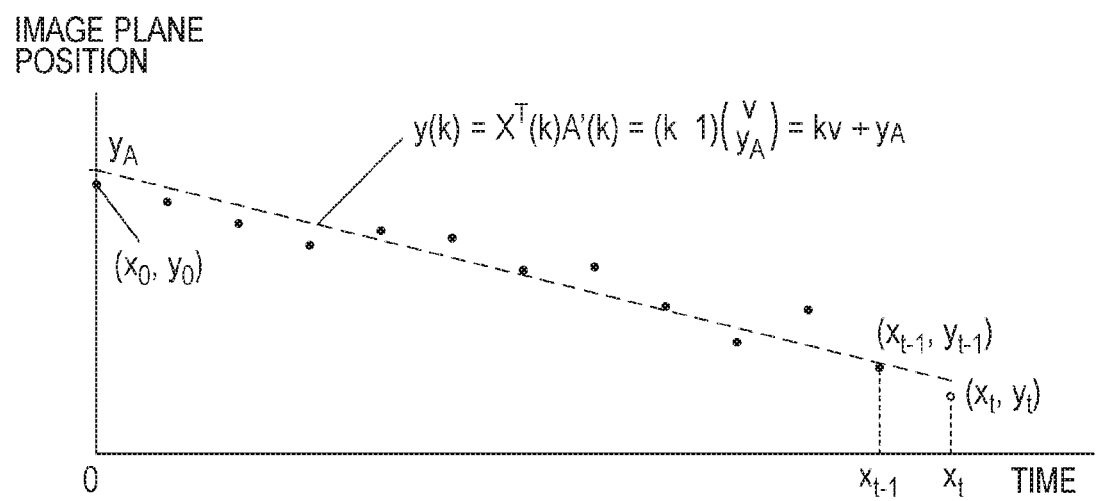
FIG. 7 is a view for explaining Kalman filter calculation in Embodiment 1.

Here, prediction of the image plane position based on the batch least squares method that is also disclosed in Japanese Patent Laid-Open No. 2001-21794 will be described in more detail with reference to FIG. 7.

An image plane position at a time $x_k$ is $y_k$ and represented by ● in the figure. Here, in a case where a plurality of ● in the figure are represented by an (n−1)th order polynomial expression model for a time t, when an image plane position is $y(t)$, a time parameter is a column vector $T(t)$, and a coefficient of the model expression is a column vector $C(t)$, a curve which is as indicated by a one dot chain line in the figure and provided by the following expression is provided.

$$y(t) = C(t)^T T(t)$$

The column vector $C(t)$ and the column vector $T(t)$ are as indicated below.

[Mathematical expression 3]

$$C(t) = \begin{bmatrix} c_0 \\ c_1 \\ \cdots \\ c_{n-1} \end{bmatrix}$$

$$T(t) = \begin{bmatrix} t^0 \\ t^1 \\ \cdots \\ t^{n-1} \end{bmatrix}$$

As a method of obtaining the column vector C described above, the batch least squares method is able to be used. It is assumed that the model expression is an (n−1)th order polynomial expression, the number of results of measuring the image plane position in the past is N, a matrix $Z(k)$ is provided on the basis of a time when a focus detection result corresponding to the image plane position in the past including the time k is obtained, and a column vector $Y(k)$ is provided by the image plane position in the past including the time k. At this time, the column vector $C(k)$ to be obtained is provided by the following expression.

$$C(k) = [Z(k)^T Z(k)]^{-1} Z(k)^T Y(k)$$

The matrix $Z(k)$ and the column vector $Y(k)$ are provided by the following expressions.

[Mathematical expression 4]

$$Z(k) = \begin{bmatrix} z^0_{k-N+1} & z^1_{k-N+1} & \cdots & z^{n-1}_{k-N+1} \\ z^0_{k-N+2} & z^1_{k-N+2} & \cdots & z^{n-1}_{k-N+2} \\ \cdots & \cdots & \cdots & \cdots \\ z^0_k & z^1_{k-N} & \cdots & z^{n-1}_k \end{bmatrix}$$

$$Y(k) = \begin{bmatrix} y_{k-N+1} \\ y_{k-N+2} \\ \cdots \\ y_k \end{bmatrix}$$

By predicting an image plane position with use of the batch least squares method described above and controlling driving of the focus lens on the basis of the image plane position, it is possible to focus on a moving object.

In a case where the image plane position of the object at a time later than a certain time is predicted by using the batch least squares method, however, there is a situation that a calculation amount is to be increased to obtain a more stable prediction result. While a calculation amount to obtain the column vector C is $O(N \cdot n^2)$, the number of results of measurement in the past N is to be increased to obtain the stable column vector C. The calculation amount increases in proportion to N.

On the other hand, an amount of the Kalman filter calculation by an n-dimensional parameter is $O(n^3)$. When the model expression is a low-dimensional expression, the number of times of the Kalman filter calculation is able to be sufficiently reduced as compared to the case of the batch least squares method of the same dimension. Moreover, when an observation result varies, it is intended that the batch least squares method takes a large number of results of observation in the past N used for the calculation, but the calculation amount of the batch least squares method is $O(Nn^2)$ as described above, and becomes much larger than the amount of the Kalman filter calculation when N increases. Thus, by performing calculation by the Kalman filter in an appropriate scene as in the present embodiment, the calculation amount is able to be made smaller than the calculation amount of the batch least squares method.

<Example of Operation of Image Pickup Processing>

Figure 2:
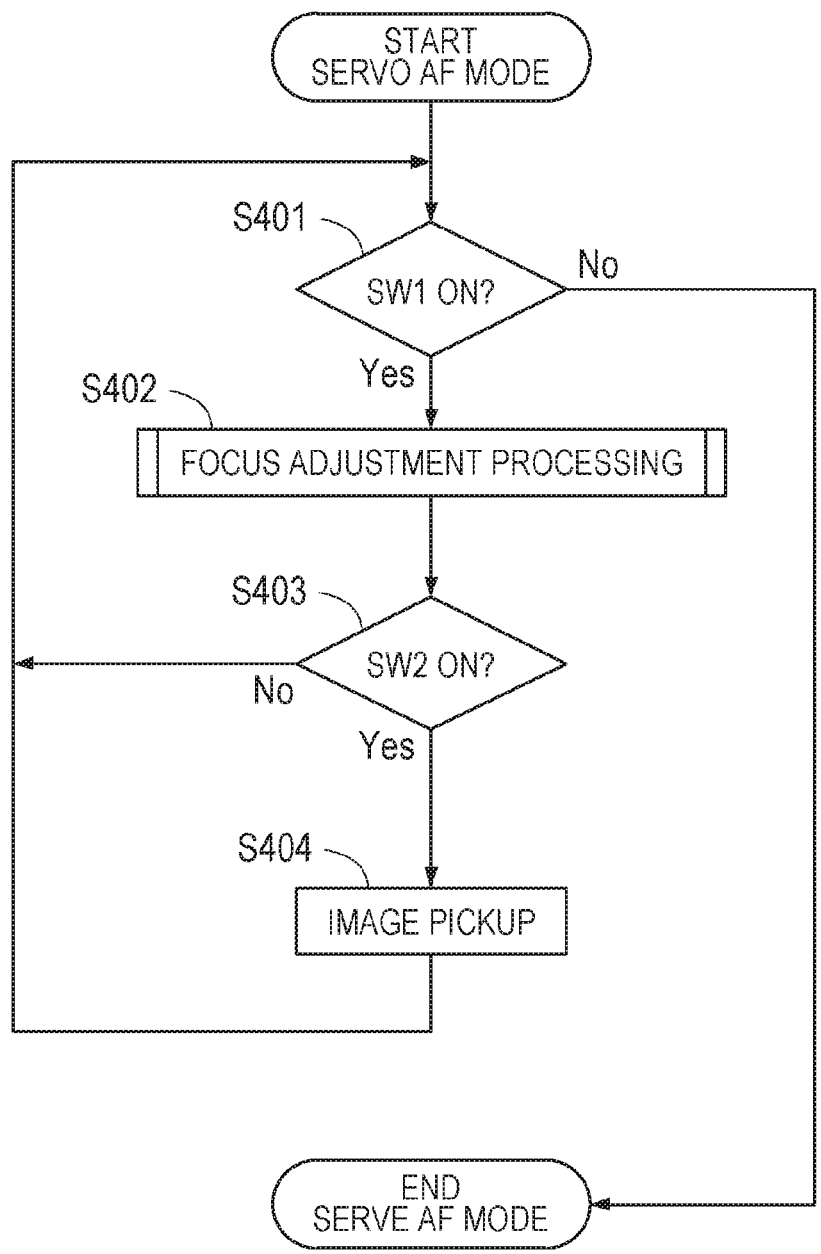
FIG. 2 is a flowchart illustrating an example of an operation of image pickup processing in Embodiment 1.

Next, an example of an operation of image pickup processing related to Embodiment 1 of the disclosure will be described with reference to a flowchart of FIG. 2.

A camera generally has two kinds of a mode (one-shot image pickup mode) in which a lens is driven for an image plane of an object at a certain time and a mode (prediction image pickup mode) in which the lens is driven while predicting the image plane of the object at a time later than a current time. Embodiment 1 indicates a motion when the camera is set to the prediction image pickup mode.

At step S401, the microcomputer 224 determines a state of the SW 1. When the SW 1 is on, the procedure proceeds to step S402. When the SW 1 is turned off, the microcomputer 224 performs control to end the prediction image pickup mode.

At step S402, the microcomputer 224 performs control to perform focus adjustment processing. Details thereof will be described later with reference to FIG. 3.

At step S403, the microcomputer 224 determines a state of the SW 2. When the SW 2 is off, the procedure returns to step S401. When the SW 2 is on, the procedure proceeds to step S404.

At step S404, the microcomputer 224 performs control to perform image pickup by flipping up the main mirror 206 and operating the focal plane shutter 211. Then, the procedure returns to step S401.

<Focus Adjustment Processing>

Figure 3:
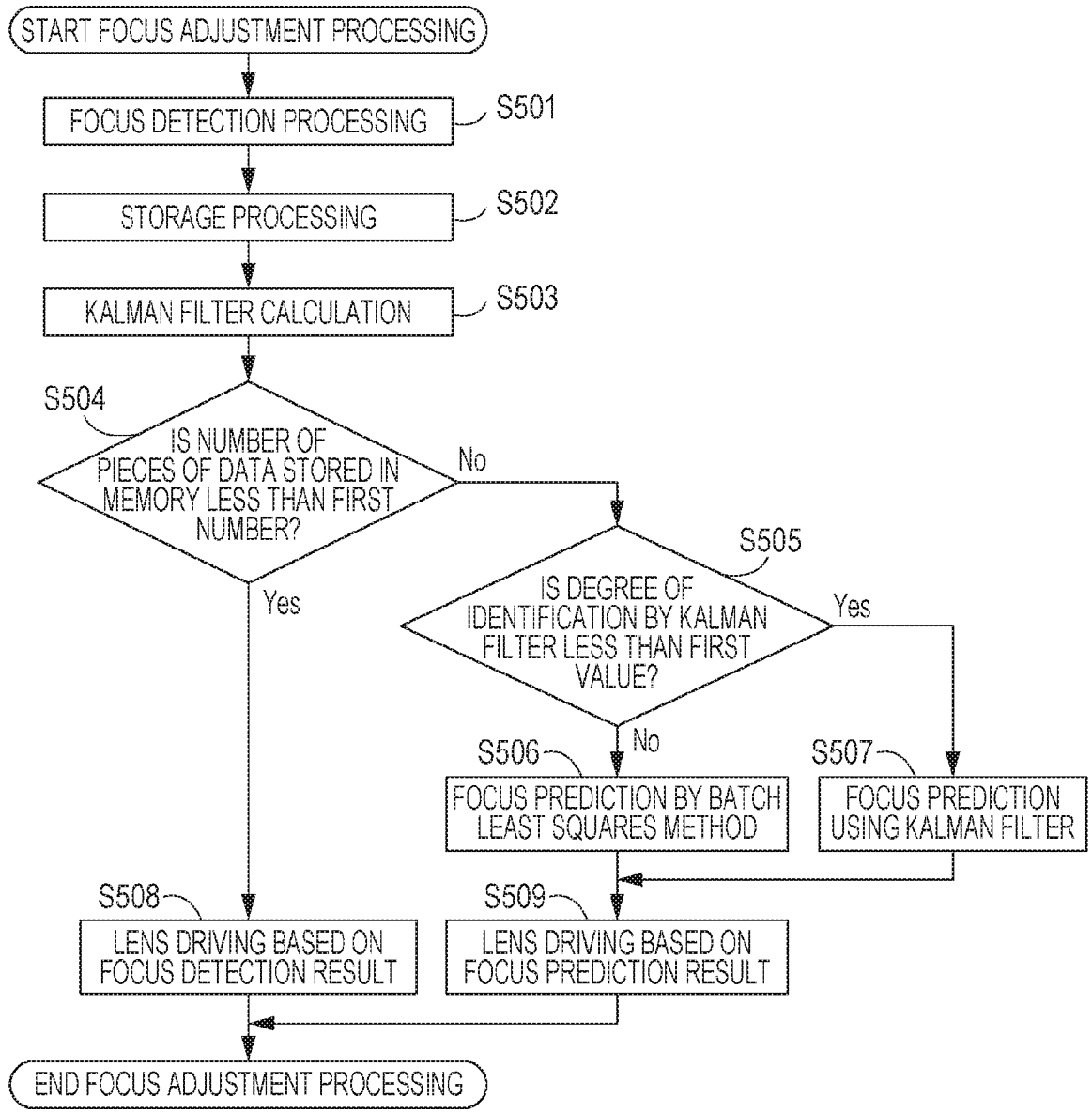
FIG. 3 is a flowchart illustrating focus adjustment processing in Embodiment 1.

Next, an example of an operation of the focus adjustment processing at step S402 will be described with reference to a flowchart of FIG. 3.

At step S501, the microcomputer 224 drives the focus detection circuit 210 and obtains a defocus amount. Further, the microcomputer 224 acquires an image plane position, which is a position where the image pickup lens is focused on an object, from the defocus amount and a current position of the image pickup lens.

At step S502, the microcomputer 224 performs control to perform storage processing. In the storage processing, a time when the image plane position and the defocus amount that are acquired at step S501 are detected is stored in a memory.

At step S503, the microcomputer 224 performs the Kalman filter calculation described above. The Kalman filter is one kind of a sequential identification method and does not need a plurality of pieces of time-series data at a time of calculation as in the batch least squares method. Here, as information about a state of the object, an image plane position and an image plane shifting speed at a time (k) are estimated from the state vector A(k).

At step S504, the microcomputer 224 performs evaluation about whether the number of pieces of data stored in the memory is less than a first number. When the number of pieces of data is less than the first number, the procedure proceeds to step S508, and when the number of pieces of data is equal to or more than the first number, the procedure proceeds to step S505.

At step S505, the microcomputer 224 evaluates a degree of identification of the Kalman filter performed at step S503. The degree of identification is evaluated by using the posterior error covariance matrix P described above. This is because use of the matrix P enables determination on whether a result of a state estimation vector A obtained in the Kalman filter calculation is converged. When the degree of identification, that is, P is less than a first value, the procedure proceeds to step S507. This is because the result of the state estimation vector A obtained in the Kalman filter calculation may not be converged, that is, an error may be caused in the image plane position obtained by the Kalman filter calculation. When the degree of identification, that is, P is equal to or more than the first value, the procedure proceeds to step S506. By switching a prediction method on the basis of the degree of identification as described above, a method that allows reduction of the calculation amount is able to be selected when the Kalman filter calculation is sufficiently converged.

At step S506, the microcomputer 224 performs focus prediction by the batch least squares method. Specifically, the microcomputer 224 obtains a model expression of the image plane position of the object by the batch least squares method by using a plurality of pieces of time-series data about the image plane position and the detection time thereof that are stored in the memory at step S502, and uses an obtained result to obtain the image plane position of the object at a time (k+1) later than the current time (k).

At step S507, the microcomputer 224 performs focus prediction by the Kalman filter. Since identification of the model expression for the image plane position of the object is achieved by obtaining the state vector A(k) at step S503, a future image plane position is predicted by a result thereof. More specifically, by using the model expression, and the image plane position (corresponding to an intercept) and the image plane shifting speed (corresponding to a slope) at the time (k), which are estimated as information related to the state of the object by obtaining the state vector A(k), the image plane position at a time k+Δd is calculated. Here, the time k+Δd is a time corresponding to an image pickup time. For example, the time k+Δd corresponds to a time of S404.

At step S508, the microcomputer 224 performs control to perform driving of the focus lens based on the result of focus detection. The microcomputer 224 drives the image pickup lens on the basis of the image plane position of the object, which is obtained at step S501.

At step S509, the microcomputer 224 performs driving of the lens based on the result of focus prediction. Since the future image plane position is obtained at step S506 or step S507, the microcomputer 224 performs the driving of the focus lens on the basis of a result thereof.

<Effect>

As described above, driving of the focus lens is controlled on the basis of the image plane position of the object, which is calculated by using the Kalman filter calculation, in Embodiment 1. As a result, it is possible to appropriately focus on a moving object while suppressing a processing load, as compared to a case where the Kalman filter calculation is not used.

Further, in Embodiment 1, by switching whether or not to use the Kalman filter calculation in accordance with a condition, it is possible to appropriately focus on a moving object while suppressing a processing load.

Embodiment 2

In Embodiment 1, an example in which the Kalman filter calculation is used when a degree of identification by the Kalman filter calculation is equal to or more than a threshold has been described.

In Embodiment 2, an example in which a motion of an object is considered in addition to a degree of identification by the Kalman filter calculation will be described. Note that, description for a point in common with Embodiment 1 will be omitted as much as possible, and a difference therefrom will be mainly described.

Since the configuration (FIG. 1) of the digital single lens reflex camera and the operation (FIG. 2) of the image pickup processing are similar to those of Embodiment 1, description thereof will be omitted.

<Focus Adjustment Processing>

Figure 4:
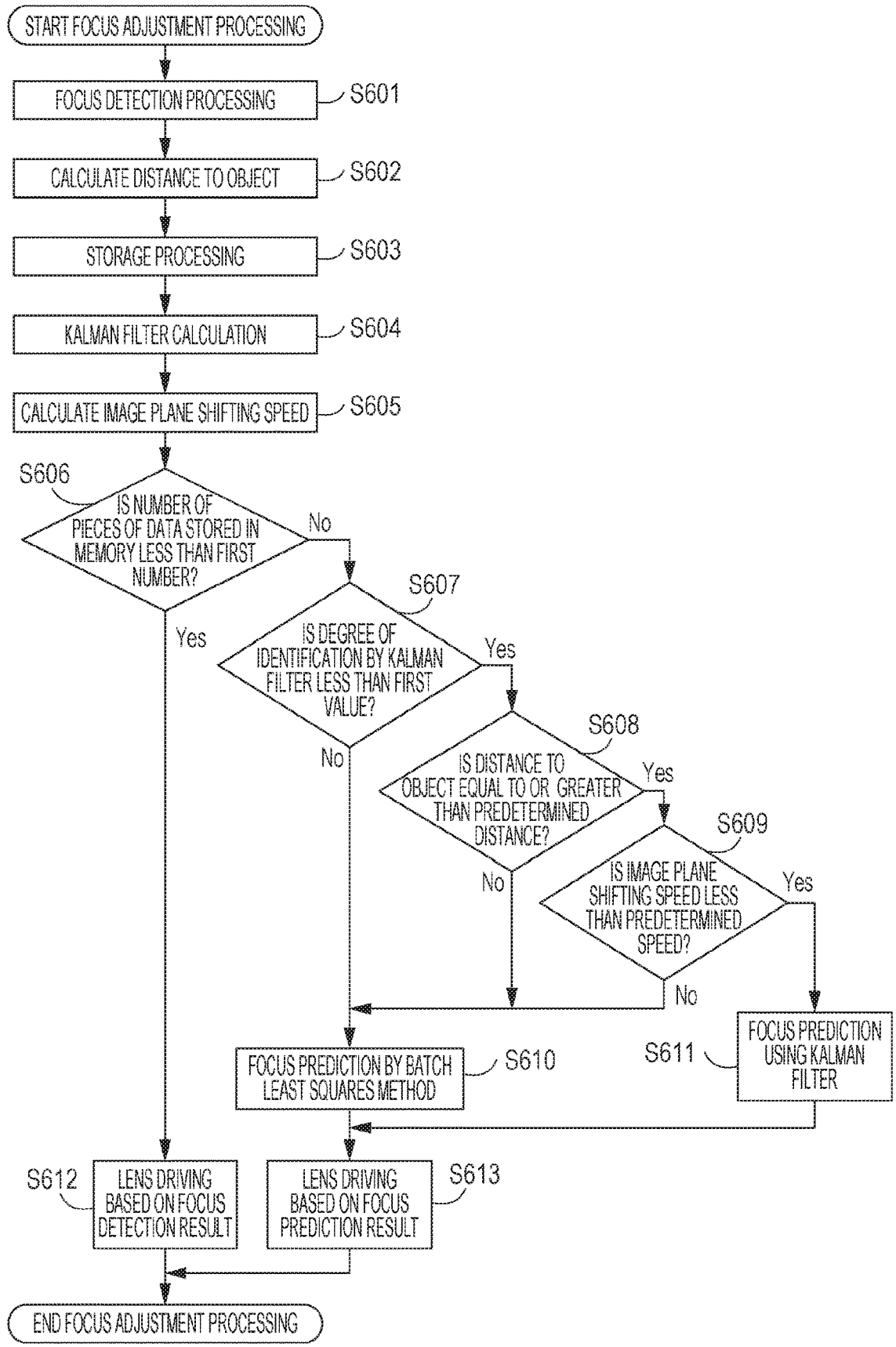
FIG. 4 is a flowchart illustrating focus adjustment processing in Embodiment 2.

An operation of focus adjustment processing in the present embodiment will be described with reference to a flowchart of FIG. 4.

Since step S601 is the same as step S501, description thereof will be omitted.

At step S602, the microcomputer 224 calculates a distance to an object. Here, the distance to the object is an image pickup distance from the camera to the object. By using the lens communication circuit 203, the microcomputer 224 acquires the distance to the object, which is obtained from a current image-forming position of the image pickup lens 201 by the image pickup lens 201.

Since steps S603 and S604 are respectively the same as steps S502 and S503, description thereof will be omitted.

At step S605, the microcomputer 224 calculates an image plane shifting speed. The image plane shifting speed may be obtained by the Kalman filter calculation of step S604. In the present embodiment, a model expression is a two-dimensional expression (linear expression) for the time k. Further, since the column vector A is defined to represent the image plane position (intercept) at the time 0 and the average image plane shifting speed (slope) at the time k, the image plane shifting speed is able to be obtained by obtaining A(k). In addition, the image plane shifting speed may be obtained by another known method.

Since steps S606 and S607 are respectively the same as steps S504 and S505, description thereof will be omitted.

At step S608, the microcomputer 224 evaluates the distance to the object. When the distance to the object, which is obtained at step S602, is equal to or greater than a first distance, the procedure proceeds to step S609, and when it is less than the first distance, the procedure proceeds to step S610. In a case where a model expression used for the Kalman filter calculation is, for example, a linear expression (two-dimensional), when the distance to the object is short, it is considered that the image plane position of the object is not suitable for the model expression. Thus, when the distance to the object is less than the first distance, the procedure proceeds to step S610 so that the future image plane position is obtained by the batch least squares method.

At step S609, the microcomputer 224 evaluates the image plane shifting speed. When the image plane shifting speed obtained at step S604 is less than a first speed, the procedure proceeds to step S611, and when it is equal to or greater than the first speed, the procedure proceeds to step S610. This is because of consideration that the image plane position of the object is not suitable for the model expression when the image plane shifting speed is high, though depending on the model expression used in the Kalman filter calculation as well.

Since steps S610 to S613 are respectively the same as steps S506 to S509, description thereof will be omitted.

<Effect>

As described above, in Embodiment 2, the Kalman filter calculation is adopted in accordance with a motion of an object to obtain an image plane position. More specifically, whether to adopt the Kalman filter calculation is switched in accordance with an image plane shifting speed corresponding to a shifting speed of the object. It is possible to appropriately focus on a moving object while suppressing a processing load.

Embodiment 3

In Embodiment 1, the example in which the Kalman filter calculation is used when a degree of identification by the Kalman filter calculation is equal to or more than the threshold has been described. Moreover, in Embodiment 2, the example in which the Kalman filter calculation is used in consideration of a motion of an object as well, as compared to Embodiment 1, has been described.

In Embodiment 3, an example in which the Kalman filter calculation is used in consideration of variation of a focus detection result will be described. Note that, description for a point in common with Embodiment 1 will be omitted as much as possible, and a difference therefrom will be mainly described.

Since the configuration (FIG. 1) of the digital single lens reflex camera and the operation (FIG. 2) of the image pickup processing are similar to those of Embodiment 1, description thereof will be omitted.

<Focus Adjustment Processing>

Figure 5:
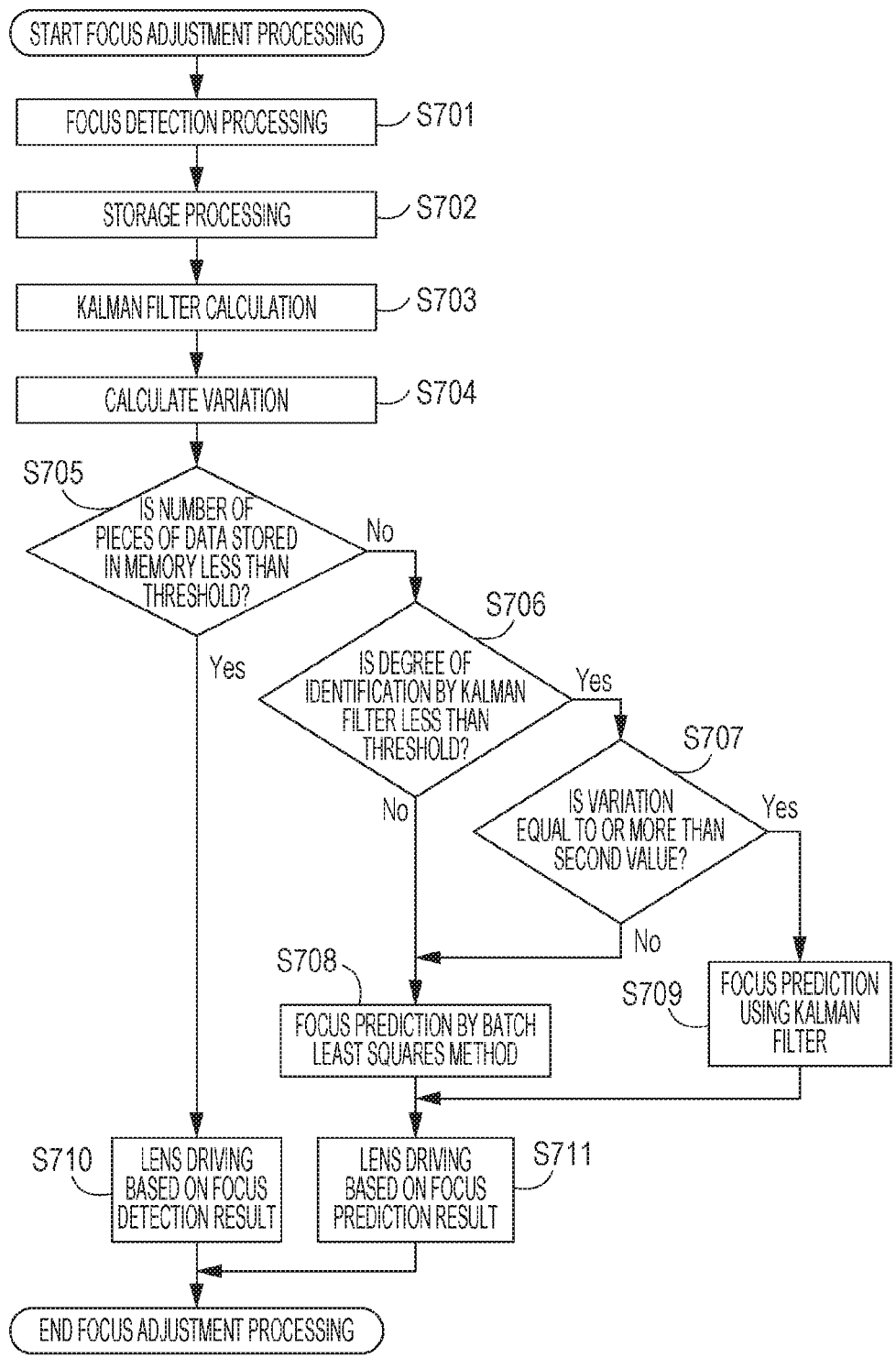
FIG. 5 is a flowchart illustrating focus adjustment processing in Embodiment 3.

An operation of focus adjustment processing in the present embodiment will be described with reference to a flowchart of FIG. 5.

Since steps S701 to S703 are respectively the same as steps S501 to S503, description thereof will be omitted.

At step S704, the microcomputer 224 calculates variation. In general, variation may be slightly generated in a focus detection result. For example, as a distance to an object is long, the variation in the focus detection result increases. At step S702, the microcomputer 224 uses an image plane position and a detection time thereof that are stored in the memory, and obtains variation (variance) of the image plane position of an object.

Since steps S705 and S706 are respectively the same as steps S504 and S505, description thereof will be omitted.

At step S707, the microcomputer 224 evaluates the variation. When the variation of the image plane position, which is obtained at step S704, is equal to or more than a second value, the procedure proceeds to step S709 to perform focus prediction using the Kalman filter calculation. The focus prediction using the Kalman filter calculation is performed because the Kalman filter calculation is calculation in consideration of an error in a detection result and a stable calculation result is able to be obtained even in a scene where variation is generated in a focus detection result. As a result, it is possible to calculate the image plane position more accurately. When the variation of the image plane position, which is obtained at step S704, is less than the second value, the procedure proceeds to step S708.

Since steps S708 to S711 are respectively the same as steps S506 to S509, description thereof will be omitted.

<Effect>

As described above, in Embodiment 3, the Kalman filter calculation is used in accordance with variation in a focus detection result. More specifically, when the variation in the focus detection result is equal to or more than a threshold, the Kalman filter calculation is used. As a result, it is possible to appropriately focus on a moving object while suppressing a processing load.

Embodiment 4

In a case where the Kalman filter calculation is used, when the matrix L and the column vector m are fixed, an image plane position of an object may deviate from a model expression depending on a motion of the object. Specifically, as the object is close, an image pickup distance is short, and as an image plane shifting speed of the object is high, the image plane position of the object easily deviates from the model expression unless an amount of a change in the state estimation vector A is increased, as compared to the other case. The amount of the change in the state estimation vector A is able to be changed by the matrix L, the column vector m, and the variance $\sigma_v^2$. Thus, an example in which the Kalman filter calculation is performed more accurately by changing a setting parameter, which is used for the Kalman filter calculation, in accordance with various conditions will be described in Embodiment 4.

First, Embodiment 4 to which the disclosure is applied will be described. Note that, description for a point in common with Embodiment 1 will be omitted as much as possible, and a difference therefrom will be mainly described.

Since the configuration (FIG. 1) of the digital single lens reflex camera and the operation (FIG. 2) of the image pickup processing are similar to those of Embodiment 1, description thereof will be omitted.

<Focus Adjustment Processing>

Figure 6:
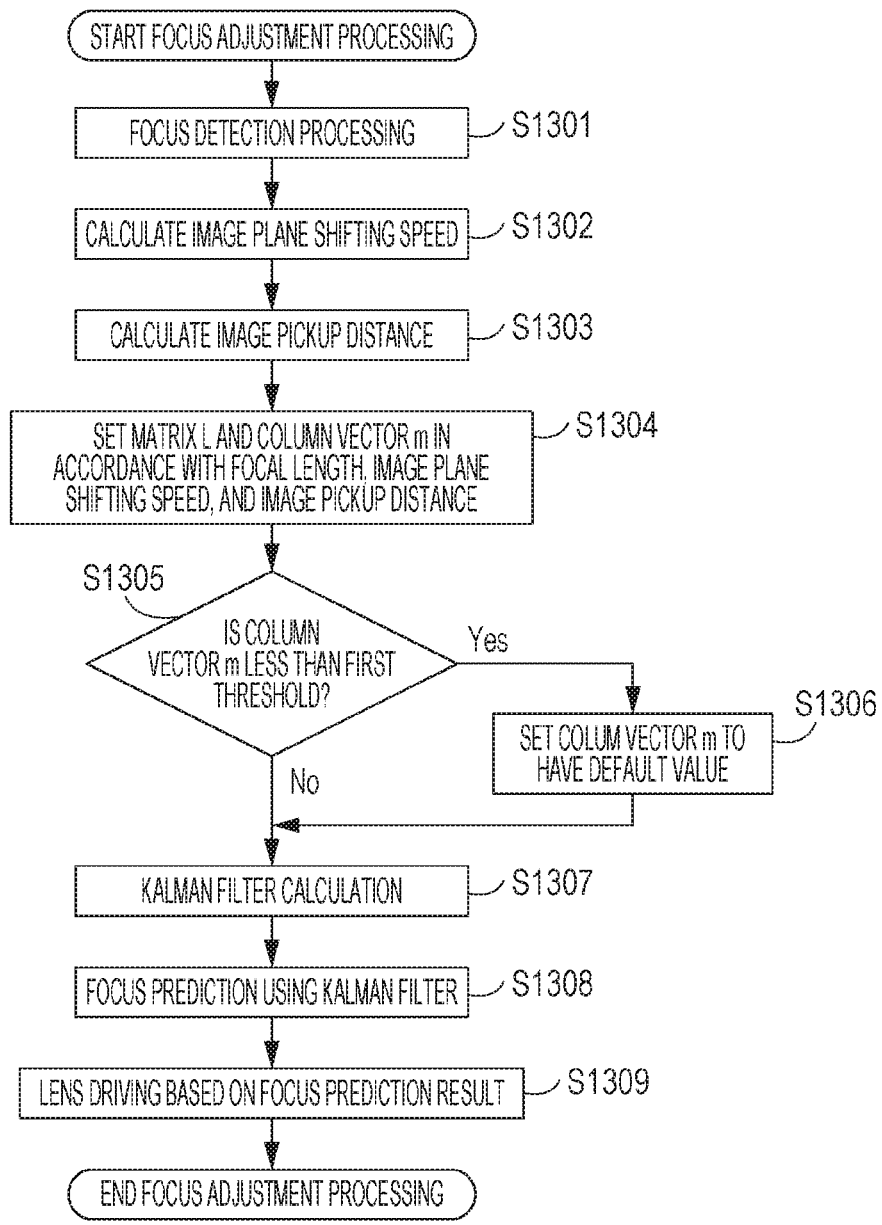
FIG. 6 is a flowchart illustrating focus adjustment processing in Embodiment 4.

Next, an example of an operation of focus adjustment processing in Embodiment 4 of the disclosure will be described with reference to a flowchart of FIG. 6.

Since step S1301 is the same as step S501, description thereof will be omitted.

At step S1302, the microcomputer 224 calculates an image plane shifting speed.

At step S1303, the microcomputer 224 calculates a distance to an object. The microcomputer 224 acquires the distance to the object, which is obtained from a current image-forming position of the image pickup lens 201 by the image pickup lens 201, by using the lens communication circuit 203.

At step S1304, the microcomputer 224 sets the matrix L and the column vector m in accordance with a focal length, the image plane shifting speed obtained at step S1302, and the distance to the object obtained at step S1303. In this manner, by changing the matrix L and the column vector m on the basis of the image plane shifting speed and the distance to the object, it is possible to obtain a future image plane position so that the distance to the object does not deviate from the model expression.

At step S1305, the microcomputer 224 evaluates the column vector m obtained at step S1304. The microcomputer 224 evaluates whether the column vector m is less than a first threshold. When the column vector m is less than the first threshold, the procedure proceeds to step S1306, and otherwise, the procedure proceeds to step S1307.

At step S1306, the microcomputer 224 sets the column vector m to have a default value. When an amount of a change indicated by the column vector m is small, the default value is set and a minimum value of the amount of the change is defined.

At step S1307, the microcomputer 224 performs the Kalman filter calculation. Since step S1307 is the same as step S503, description thereof will be omitted.

At step S1308, the microcomputer 224 performs focus prediction by the Kalman filter. Since step S1308 is the same as step S507, description thereof will be omitted.

At step S1309, the microcomputer 224 controls driving of the focus lens based on a focus prediction result. Since a future image plane position is obtained at step S1308, the microcomputer 224 controls the driving of the focus lens on the basis of a result thereof.

<Effect>

According to the embodiment described above, by changing the matrix L and the column vector m in accordance with various conditions, it is possible to obtain a future image plane position by using the Kalman filter even under a condition under which an image plane position of an object may deviate from a model expression.

Embodiment 5

In Embodiments 1 to 3, an example in which the batch least squares method and the Kalman filter calculation are switched has been described. In Embodiment 4, an example in which a setting parameter used for the Kalman filter calculation is changed in accordance with various conditions has been described. In Embodiment 5, an example in which a plurality of kinds of Kalman filter calculation that are different in setting parameter used for the Kalman filter calculation are used in accordance with information corresponding to a motion of an object will be described. In the present embodiment, a case where the information corresponding to the motion of the object is an image plane shifting speed will be described as an example. Description for a point in common with Embodiment 1 will be omitted as much as possible, and a difference therefrom will be mainly described.

Since the configuration (FIG. 1) of the digital single lens reflex camera and the operation (FIG. 2) of the image pickup processing are similar to those of Embodiment 1, description thereof will be omitted.

<Kalman Filter Calculation in Present Embodiment>

The Kalman filter calculation in the present embodiment will be described. A difference from the Kalman filter calculation described in Embodiment 1 will be mainly described.

The column vector A(k) and the prior state estimation vector A'(k) at the time k are defined so as to represent an estimated image plane position and an estimated image plane shifting speed at the time k, and the column vector X is defined so as to have a constant 1 and a constant 0.

Figure 10:
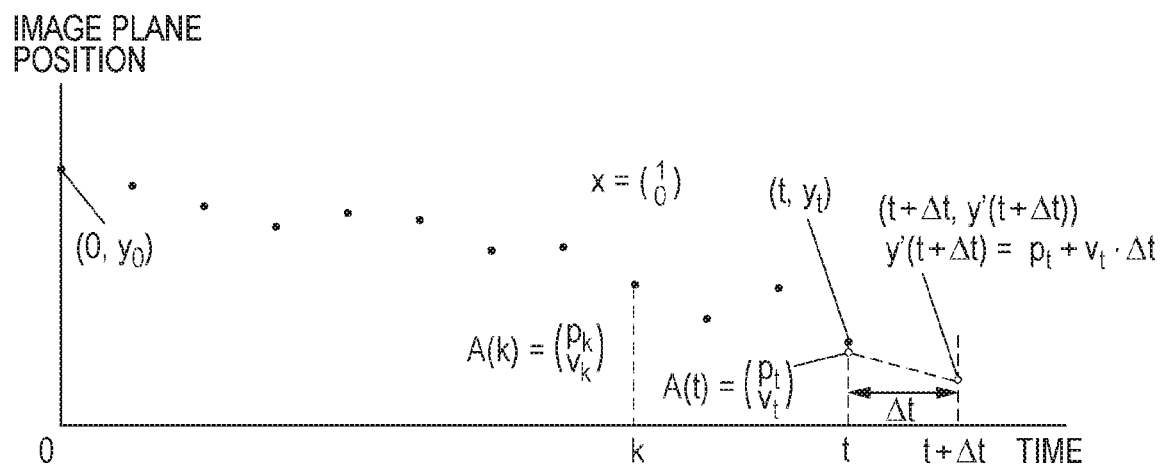
FIG. 10 is a view for explaining Kalman filter calculation in Embodiment 5.

Here, a model expression for predicting a motion of an object will be described. FIG. 10 illustrates an example thereof. Considered is prediction of the image plane position of the object, which is performed by a linear expression (two-dimensionally) as indicated by a broken line in FIG. 10. An image plane position $y_t$ is observed at any time t. In the Kalman filter calculation of the present embodiment, a column vector A(t) indicates an estimated image plane position $p_t$ and an estimated image plane shifting speed $v_t$ at the time t, so that an estimated image plane position $y'(t+\Delta t)$ at a time $t+\Delta t$ is able to be predicted from the image plane position $y_t$ and the estimated image plane shifting speed $v_t$ at the time t, and is specifically obtained by the following expression.

$$y'(t+\Delta t)=v_t\cdot\Delta t+p_t \quad \text{[Mathematical expression 5]}$$

The Kalman filter calculation of the present embodiment is just an example and the number of dimensions of a state to be estimated is two, but the number of dimensions of the state may be any number.

<First Kalman Filter and Second Kalman Filter>

The Kalman filter calculation is able to have characteristics changed depending on a dimension of the calculation and a setting parameter. On the other hand, since a range in which an image plane position is able to be appropriately followed varies in accordance with a dimension of the calculation and a setting parameter, accuracy of prediction of an image plane position may be lowered depending on a dimension of the calculation and a setting parameter that are set to a certain Kalman filter.

Thus, in the present embodiment, by selectively and properly using a plurality of Kalman filters that are different in setting parameter, accuracy of prediction of the image plane position is enhanced. In the present embodiment, a case where a first Kalman filter and a second Kalman filter are properly used will be exemplified.

The first Kalman filter and the second Kalman filter in the present embodiment are different in setting parameter. In the present embodiment, when a posterior state estimated value A(k) is calculated on the basis of a prior state estimated value A'(k), a degree of correction of the prior state estimated value A'(k) is differentiated. That is, the setting parameter is differentiated so that $g(k)(y(k)-X^T(k)A'(k))$ in the expression cited again below is different between the first Kalman filter and the second Kalman filter.

$$A(k)=A'(k)+g(k)(y(k)-X^T(k)A'(k)) \quad \text{[Mathematical expression 6]}$$

In the present embodiment, the first Kalman filter and the second Kalman filter are set so as to be different in the Kalman gain g(k) as the setting parameter. The first Kalman filter is set so as to have a larger Kalman gain g(k) as compared to that of the second Kalman filter.

Thereby, in a case where calculation is performed by using the first Kalman filter, there is a difference as follows as compared to a case where calculation is performed by using the second Kalman filter. The posterior state estimated value A(k) to which a difference between y(k) that is an actual detection result and $X^T(k)A'(k)$ based on a detection result that is predicted in advance is more greatly reflected is calculated.

The second Kalman filter has an amount of a change of the posterior state estimated value A reduced as compared to that of the first Kalman filter, and is thus suitable for a case where the image plane shifting speed is slower. This is because, in a scene where the image plane shifting speed is low, an error is difficult to be generated in a result of predicting the image plane position as compared to a scene where the image plane shifting speed is high. When calculation is performed by setting large g(k) in such a case, over correction may be caused.

On the other hand, the first Kalman filter has an amount of a change of the posterior state estimated value A increased as compared to that of the second Kalman filter, and is thus suitable for a case where the image plane shifting speed is higher. This is because, in a scene where the image plane shifting speed is high, an error may be easily generated in a result of predicting the image plane position and the generated error may be greater, as compared to a scene where the image plane shifting speed is low.

The Kalman gain g(k) is defined in accordance with the priori error covariance matrix P'(k) as indicated by the expression cited again below.

$$g(k) = \frac{P'(k)X(k)}{\sigma_\omega^2(k) + X^T(k)P'(k)X(k)}$$ [Mathematical expression 7]

The priori error covariance matrix P'(k) is adjusted by coefficients such as the matrix L, the column vector m, and the variance $\sigma_v^2$ as indicated by the expression cited again below.

$$P'(k)=L(k-1)P(k-1)L^T(k-1)+\sigma_v^2(k-1)m(k-1)m^T(k-1)$$

More specifically, in the first Kalman filter, when any coefficient of the matrix L, the column vector m, and the variance $\sigma_v^2$ is focused on, the parameter is set so that the coefficient is larger than that of the second Kalman filter. Thereby, a larger priori error covariance matrix P'(k) is able to be obtained in the first Kalman filter as compared to that of the second Kalman filter.

<Focus Adjustment Processing>

Figure 8:
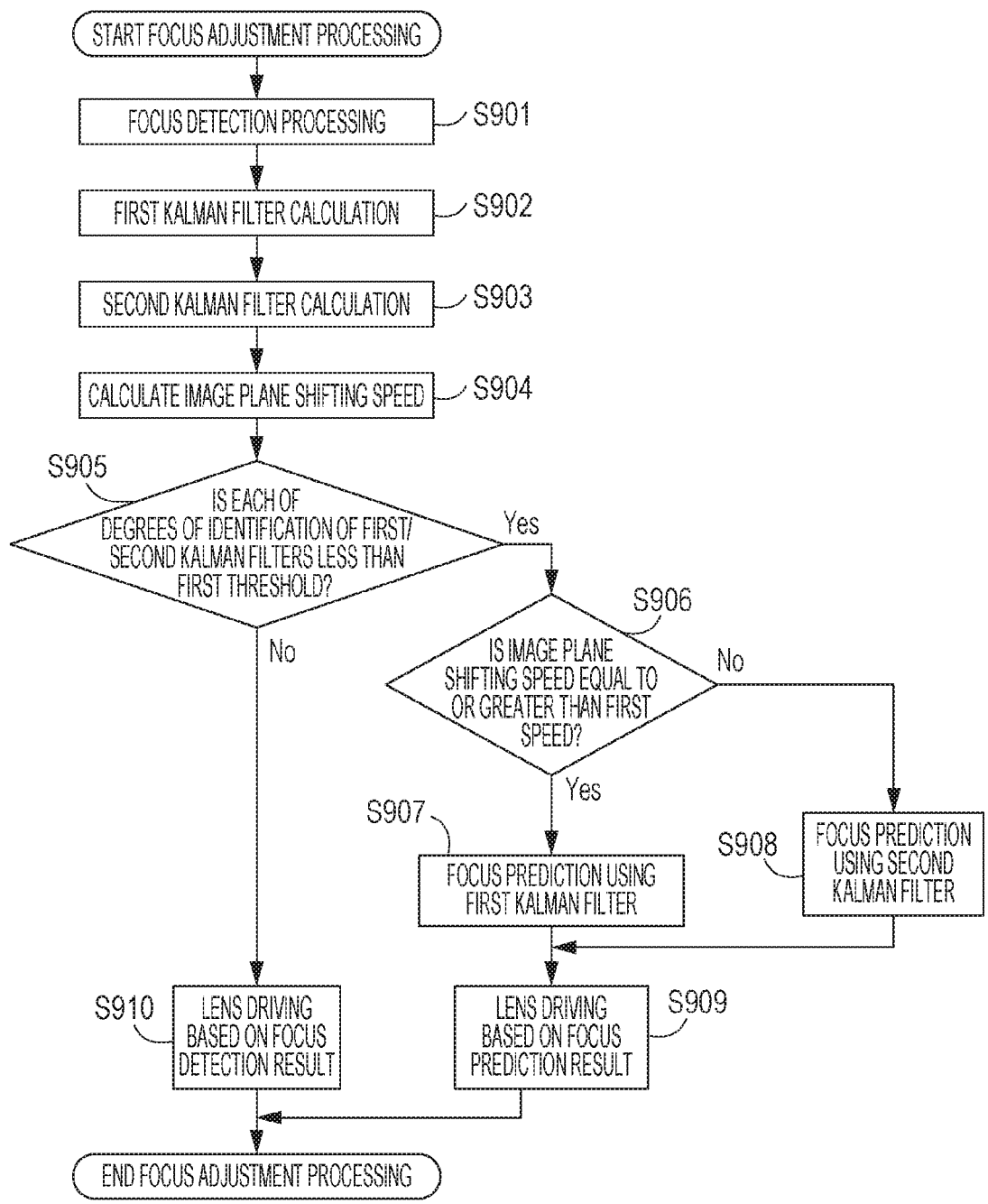
FIG. 8 is a flowchart illustrating focus adjustment processing in Embodiment 5.

Next, an example of an operation of focus adjustment processing in Embodiment 5 of the disclosure will be described with reference to a flowchart of FIG. 8.

Since step S901 is the same as step S501, description thereof will be omitted.

At step S902, the microcomputer 224 calculates the first Kalman filter.

At step S903, the microcomputer 224 calculates the second Kalman filter.

Since step S904 is the same as step S605, description thereof will be omitted.

At step S905, the microcomputer 224 evaluates a degree of identification of the first Kalman filter and a degree of identification of the second Kalman filter. The degree of identification is evaluated in a similar manner to step S505. When the degree of identification of the first Kalman filter and the degree of identification of the second Kalman filter are less than a first threshold, the procedure proceeds to step S906. When the degree of identification of the first Kalman filter and the degree of identification of the second Kalman filter are equal to or more than the first threshold, the procedure proceeds to step S910.

At step S906, the microcomputer 224 evaluates the image plane shifting speed. When the image plane shifting speed obtained at step S904 is less than a first speed, the procedure proceeds to step S908, and when it is equal to or greater than the first speed, the procedure proceeds to step S907. This is because consideration is made so that a setting parameter of the first Kalman filter is set to be one with which the image plane position is easily followed when the image plane shifting speed is higher, as compared to a setting parameter of the second Kalman filter.

At step S907, the microcomputer 224 performs focus prediction by the first Kalman filter.

At step S908, the microcomputer 224 performs focus prediction by the second Kalman filter.

Since step S909 is the same as step S509, description thereof will be omitted.

Since step S910 is the same as step S508, description thereof will be omitted.

<Effect>

As described above, in Embodiment 5, by using a plurality of kinds of Kalman filter calculation in a switching manner in accordance with an image plane shifting speed, it is possible to set a focal position on an object.

Embodiment 6

In Embodiment 5, an example in which a plurality of kinds of Kalman filter calculation are used in accordance with an image plane shifting speed that is an example of information corresponding to a motion of an object has been described. In Embodiment 6, an example in which a plurality of kinds of Kalman filter calculation are used will be described by taking a case where information corresponding to a motion of an object is an image plane shifting acceleration speed (also referred to as a shifting acceleration speed of an image plane position) as an example. Note that, description for a point in common with Embodiment 5 will be omitted as much as possible, and a difference therefrom will be mainly described.

Since the configuration (FIG. 1) of the digital single lens reflex camera and the operation (FIG. 2) of the image pickup processing are similar to those of Embodiment 1, description thereof will be omitted.

<Focus Adjustment Processing>

Figure 9:
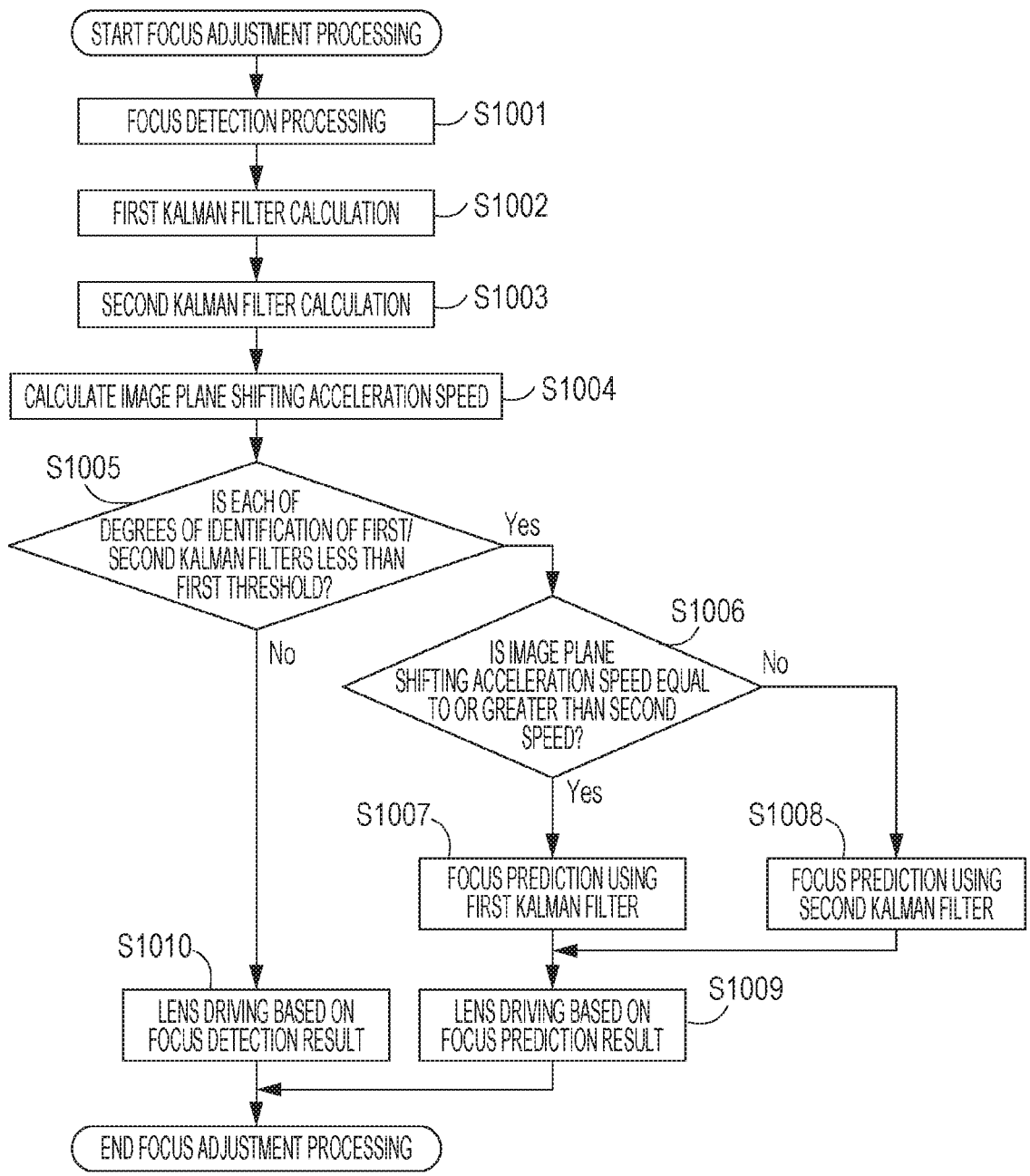
FIG. 9 is a flowchart illustrating focus adjustment processing in Embodiment 6.

Next, an example of an operation of focus adjustment processing in Embodiment 6 of the disclosure will be described with reference to a flowchart of FIG. 9.

Since steps S1001 to S1003 are respectively the same as steps S901 to S903, description thereof will be omitted.

At step S1004, the microcomputer 224 calculates the image plane shifting acceleration speed. The microcomputer 224 may obtain the image plane shifting acceleration speed by the first Kalman filter calculation of S1002.

Since step S1005 is the same as step S905, description thereof will be omitted.

At step S1006, the microcomputer 224 evaluates the image plane shifting acceleration speed. When the image plane shifting acceleration speed obtained at step S1004 is less than a second speed, the procedure proceeds to step S1008, and when it is equal to or greater than the second speed, the procedure proceeds to step S1007. In a case where the image plane shifting acceleration speed is high, an error is easily caused in a result of predicting the image plane position as compared to a case where the image plane shifting acceleration speed is low. Accordingly, in the present embodiment, calculation is performed by the first Kalman filter in the case where the image plane shifting acceleration speed is high and by the second Kalman filter in the case where the image plane shifting acceleration speed is low.

This is because consideration is made so that the setting parameter of the first Kalman filter is set to be one with which the image plane position is easily followed when the image plane shifting speed is higher, as compared to the setting parameter of the second Kalman filter. The image plane shifting acceleration speed to be evaluated may be evaluated by using an absolute value thereof.

Since steps S1007 to S1010 are respectively the same as steps S907 to S910, description thereof will be omitted.

<Effect>

As described above, in Embodiment 6, by using a plurality of kinds of Kalman filter calculation in a switching manner in accordance with an image plane shifting acceleration speed, it is possible to set a focal position on an object.

Other Embodiment

Though the Kalman filter calculation is used as an example of the sequential identification method in the embodiments described above, a sequential least squares method (RLS method) that is another kind of sequential identification method may be used. In this case, $\sigma^2_\omega(k)=1$ is provided. That is, the sequential least squares method is a specific example in which the number of parameters that are set is small in the Kalman filter calculation of the present embodiment. Thus, the same effect as that of the Kalman filter is obtained from a viewpoint of a calculation amount.

As a model expression, a model expression other than ones introduced in the embodiments described above is able to be used.

Moreover, though an example in which, as information about a state of an object, an image plane position and an image plane shifting speed at the time k are calculated from the state vector A(k) has been described in the embodiments described above, the information is not limited thereto as long as being related to the state of the object. For example, a configuration in which the image plane position and an object shifting speed at the time k are calculated from the state vector A(k) may be provided.

Moreover, though description has been given that the matrix L and the column vector m are set in accordance with various conditions in Embodiment 4, at least one of the matrix L, the column vector m, and the variance $\sigma_v^2$ may be set.

The matrix L, the column vector m, and the variance $\sigma_v^2$ may be set by a user. Thereby, a calculation result is able to be adjusted in accordance with characteristics of an image pickup scene, which are recognized by the user.

Moreover, though description has been given that the first Kalman filter and the second Kalman filter are properly used in accordance with an image plane shifting speed in Embodiment 5 and in accordance with an image plane shifting acceleration speed in Embodiment 6, there is no limitation thereto as long as an index enables determination that a change of a motion of an object is great. For example, an image pickup distance may be used as information corresponding to the motion of the object. In a case where the image pickup distance is long, an amount of a change in an image plane position is small as compared to a case where the image pickup distance is short. Thus, a great influence is given by an error in a focus detection result in the case where the image pickup distance is long, as compared to the case where the image pickup distance is short. Accordingly, the Kalman filters may be properly used in accordance with the image pickup distance. For example, when the image pickup distance is equal to or greater than a first distance, the first Kalman filter is used, and when it is less than the first distance, the second Kalman filter is used.

An angular speed may be used as information corresponding to the motion of the object. In a case where the angular speed is high, it is considered that the object is followed while a camera is panned or a scene changes greatly. Thus, an error in a focus detection result with respect to an actual motion of the object gives a greater influence. Accordingly, for example, when the angular speed is equal to or greater than a third speed, the first Kalman filter is used, and when it is less than the third speed, the second Kalman filter is used. As a result, it is possible to more accurately focus on the object even in a scene where the angular speed is high.

The disclosure is also able to be realized by processing in which a program that realizes one or more functions of the aforementioned embodiments is supplied to a system or an apparatus via a network or a storage medium and one or more processors in a computer of the system or the apparatus reads out and executes the program. Moreover, the disclosure is able to be realized also by a circuit (for example, an ASIC) that realizes one or more functions.

Though suitable embodiments of the disclosure have been described above, the disclosure is not limited to the embodiments, and various modifications and changes are allowed within a range of the gist.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-228923 filed Dec. 6, 2018, which is hereby incorporated by reference herein in its entirety.

What is claimed is:

1. An apparatus comprising:
   at least one processor; and
   a memory coupled to the at least one processor storing instructions that, when executed by the processor, cause the processor to function as:
   a detection unit configured to acquire a focus detection result;

an estimation unit configured to estimate information corresponding to an image plane position of an object based on a sequential identification method using the focus detection result;
a prediction unit configured to predict information corresponding to a future image plane position of the object based on the estimated information corresponding to the image plane position of the object; and
a control unit configured to control driving of a focus lens based on the predicted information corresponding to the future image plane position of the object, wherein
the estimation unit includes a first estimation unit configured to estimate first information as the information corresponding to the image plane position of the object and a second estimation unit configured to estimate second information as the information corresponding to the image plane position of the object,
the prediction unit selects any of the first information and the second information in accordance with information corresponding to a motion of the object and uses the resultant for prediction of the information corresponding to the future image plane position of the object,
the first estimation unit and the second estimation unit perform, at a time earlier than a first time, first estimation to estimate the information corresponding to the future image plane position of the object at the first time, and
perform second estimation to estimate the information corresponding to the image plane position of the object at the first time based on an error between the acquire focus detection result at a time corresponding to the first time and a result of the first estimation.

2. The apparatus according to claim 1, wherein the first estimation unit performs estimation so that a degree at which the error is reflected is greater than that in the second estimation unit.

3. The apparatus according to claim 2, wherein when a gain of correcting the degree at which the error is reflected increases more, the degree at which the error is reflected is greater.

4. The apparatus according to claim 3, wherein the first estimation unit performs calculation so that the gain is greater than that in the second estimation unit.

5. The apparatus according to claim 1, wherein in a case where the information corresponding to the motion of the object is an image plane shifting speed, when the image plane shifting speed is equal to or greater than a first speed, the prediction unit predicts the information corresponding to the future image plane position of the object based on the first estimation unit.

6. The apparatus according to claim 1, wherein in a case where the information corresponding to the motion of the object is a shifting acceleration speed of the image plane position, when the shifting acceleration speed of the image plane position is equal to or greater than a second speed, the prediction unit predicts the information corresponding to the future image plane position of the object based on the first estimation unit.

7. The apparatus according to claim 1, wherein in a case where the information corresponding to the motion of the object is an image pickup distance, when the image pickup distance is equal to or greater than a first distance, the prediction unit predicts the information corresponding to the future image plane position of the object based on the first estimation unit.

8. The apparatus according to claim 1, wherein in a case where the information corresponding to the motion of the object is an angular speed, when the angular speed is equal to or greater than a third speed, the prediction unit predicts the information corresponding to the future image plane position of the object based on the first estimation unit.

9. The apparatus according to claim 1, wherein
the estimation unit estimates an image plane shifting speed based on the sequential identification method using the focus detection result, and
the prediction unit predicts the information corresponding to the future image plane position of the object based on the information corresponding to the image plane position of the object and estimated by the estimation unit.

10. A method for controlling an apparatus, the method comprising:
acquiring a focus detection result;
estimating information corresponding to an image plane position of an object based on a sequential identification method using the focus detection result;
predicting information corresponding to a future image plane position of the object based on the estimated information corresponding to the image plane position of the object; and
controlling driving of a focus lens based on the predicted information corresponding to the future image plane position of the object, wherein
the estimating includes estimating first information as the information corresponding to the image plane position of the object and estimating second information as the information corresponding to the image plane position of the object,
in the predicting, any of the first information and the second information is selected in accordance with information corresponding to a motion of the object and used for prediction of the information corresponding to the future image plane position of the object,
performing, at a time earlier than a first time, first estimation to estimate the information corresponding to the future image plane position of the object at the first time, and
performing second estimation to estimate the information corresponding to the image plane position of the object at the first time based on an error between the acquire focus detection result at a time corresponding to the first time and a result of the first estimation.

11. The method according to claim 10, wherein the performing the first estimation performs estimation so that a degree at which the error is reflected is greater than that in the second estimation.

12. The method according to claim 11, wherein when a gain of correcting the degree at which the error is reflected increases more, the degree at which the error is reflected is greater.

13. The method according to claim 12, wherein the performing the first estimation performs calculation so that the gain is greater than that in the second estimation.

14. The method according to claim 10, wherein in a case where the information corresponding to the motion of the object is an image plane shifting speed, when the image plane shifting speed is equal to or greater than a first speed, the predicting predicts the information corresponding to the future image plane position of the object based on the first estimation.

15. The method according to claim 10, wherein in a case where the information corresponding to the motion of the object is a shifting acceleration speed of the image plane position, when the shifting acceleration speed of the image plane position is equal to or greater than a second speed, the predicting predicts the information corresponding to the future image plane position of the object based on the first estimation.

16. The method according to claim 10, wherein in a case where the information corresponding to the motion of the object is an image pickup distance, when the image pickup distance is equal to or greater than a first distance, the predicting predicts the information corresponding to the future image plane position of the object based on the first estimation.

17. The method according to claim 10, wherein in a case where the information corresponding to the motion of the object is an angular speed, when the angular speed is equal to or greater than a third speed, the predicting predicts the information corresponding to the future image plane position of the object based on the first estimation.

18. The method according to claim 10, wherein
the estimating estimates an image plane shifting speed based on the sequential identification method using the focus detection result, and
the predicting predicts the information corresponding to the future image plane position of the object based on the estimated information corresponding to the image plane position of the object.

* * * * *